United States Patent Office 2,805,125
Patented Sept. 3, 1957

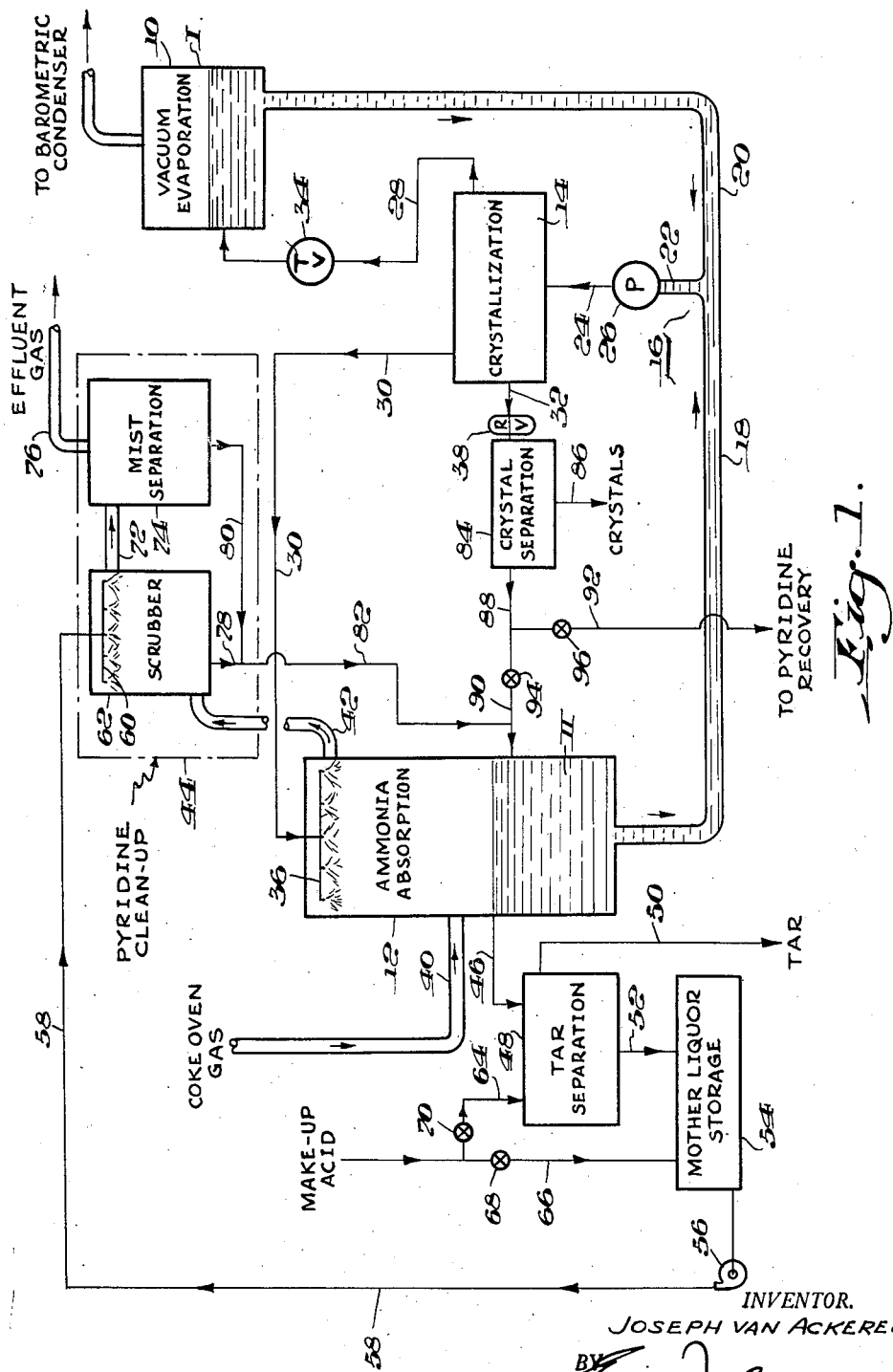

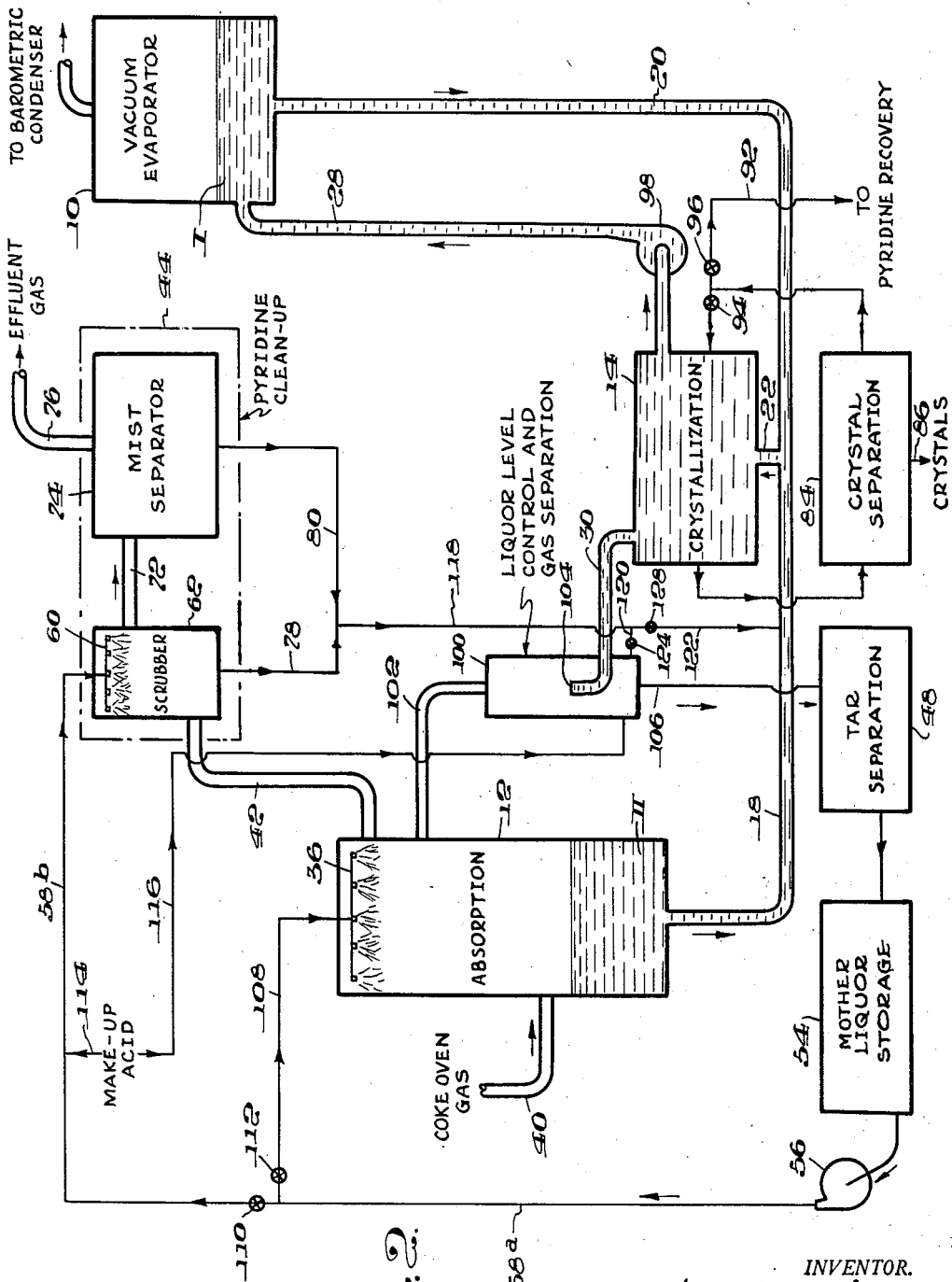

2,805,125

METHODS AND APPARATUS FOR THE MANUFACTURE OF AMMONIUM SULFATE

Joseph van Ackeren, Pittsburgh, Pa., assignor to Koppers Company, Inc., a corporation of Delaware Application December 2, 1952, Serial No. 323,615

7 Claims. (Cl. 23—119)

This invention relates to the manufacture of ammonium sulfate and is particularly directed to methods and apparatus for the absorption of ammonia from coke oven gas in a dilute sulfuric acid solution and the crystallization of ammonium sulfate therefrom.

Ammonia is commonly recovered from a coke oven gas as ammonium sulfate because of the demand for the latter in commercial fertilizers. The processes used are commonly classified as indirect and direct processes depending upon whether the ammonia is first scrubbed from the coke oven gas by water and then regenerated in an ammonia still before bringing it into contact with sulfuric acid or whether the coke oven gas is brought directly into contact with the sulfuric acid. The third type known as the semi-direct process is a combination of the two.

The present invention is directed to process and apparatus particularly suited for the production of ammonium sulfate by the direct and semi-direct processes and has for its general objects to provide processes and apparatus which are well adapted for the handling of the large volume of gas required in the direct and semi-direct processes, which are not sensitive to the impurities present in such gases, and which make it possible to obtain crystals of suitable size to meet the demands of the trade.

These objects are in general accomplished by arranging an absorber, a crystallizer, and a vacuum evaporator in a bicyclic circuit having as a common unit the crystallizer by means of conduits including a bifurcated one having its stem opening into the bottom of said crystallizer and its branches respectively communicating with the absorber and the vacuum evaporator and unrestrictedly with each other and causing a flow of absorbent in said circuit into the crystallizer through the stem of the bifurcated conduit. By this arrangement, a flow of mother liquor is set up in one cycle involving the crystallizer, a conduit leading from the crystallizer to the vacuum evaporator, the vacuum evaporator, and one branch of the bifurcated conduit in which cycle the mother liquor is supersaturated in the vacuum evaporator and desupersaturated in the crystallizer, and in another cycle including the crystallizer, a conduit leading from the crystallizer to the absorber, the absorber and the other branch of the bifurcated conduit in which other cycle ammonia is absorbed into the mother liquor. The rich mother liquor thus obtained is comingled with the supersaturated mother liquor passing into the crystallizer and supplies the solute required for continuous crystallization. A balanced circuit is maintained by incorporating sulfuric acid into the absorption cycle in an amount equivalent to the ammonia absorbed therein and by withdrawing ammonium sulfate crystals from the crystallizer to product in the amount equivalent to the ammonium sulfate formed in the absorber.

The apparatus units are arranged at suitable elevations to provide by virtue of the unrestricted communication between the vacuum evaporator and the absorber two hydrostatic columns, the one surfacing in the vacuum evaporator and the other surfacing in the absorber or the conduit leading from the absorber. Because these two columns are unrestrictedly connected with each other, the distribution of the liquid in the two columns will depend upon the pressure of gas above the surface of the columns. Since the first hydrostatic column surfaces in the vacuum evaporator where the pressure is relatively low, the liquid will rise to a relatively high level in that column as compared with the second hydrostatic column which surfaces in the absorber under the pressure of the gas therein which normally deviates from atmospheric pressure only as required to maintain the flow of gas in the system. The difference in the level between the two columns is a function of the differential between the pressure of the gases above the two columns. The mother liquor in both columns flows downwardly, becomes comingled, and as comingled passes into the crystallizer where the supersaturation is deposited on crystals already formed and the mother liquor thus desupersaturated. The desupersaturated liquor is then divided into two streams and flows respectively to the vacuum evaporator and to the absorber. A bicyclic circuit is thus set up with the crystallizer in common with both cycles.

The invention may be more fully understood by reference to accompanying drawings in which:

Fig. 1 is a flow sheet illustrating one form of the invention, and

Fig. 2 is a flow sheet illustrating another form of the invention.

Referring now more particularly to Fig. 1, there will be seen a hydrostatic column I of mother liquor surfacing in a vacuum evaporator 10 and a second hydrostatic column II surfacing in an ammonia absorber 12. These two hydrostatic columns are connected with a crystallizer 14 by means of a bifurcated conduit 16 having branches 18 and 20 and stem 22. It will be observed that branches 18 and 20 are in unrestricted communication with the two hydrostatic columns and with each other so that the two hydrostatic columns balance each other and the pressure at any place in the two columns and the connecting conduits is the hydrostatic pressure for the particular elevation (not counting the pressure drop induced by the flow of solution). In these unrestricted portions of the system, the pressure induced by the flow of solution is very small relative to the hydrostatic pressure and, therefore, can be disregarded.

In stem 22—24, there is provided pump 26 arranged to cause the mother liquor to flow through conduit 24 into the crystallizer 14. This crystallizer, as above explained, is constructed as a closed pressure-tight shell, that is, is not open to the atmosphere, so that the mother liquor which flows into it must flow out through the outlet conduits 28, 30, and 32 under the super-hydrostatic pressure generated by the pump 26.

The pressure existing in the crystallizer and in lines 24, 28, 30, and 32 is equal to the hydrostatic pressure plus the plus pressure generated by pump 26. A throttling valve 34 is provided in line 28 to make it possible to increase or decrease this plus pressure. In this manner, the pressure applied to spray heads 36 of absorber 12 may be regulated. The plus pressure is maintained in line 32 by means of a suitable reducing valve 38.

The height of the first hydrostatic column I determines the hydrostatic pressure in the system. Thus the hydrostatic pressure on the spray heads 36 is determined by the height of the column from the elevation of the spray heads to the surface in the vacuum evaporator 10. It is advantageous in the process and apparatus of this invention, therefore, to locate the spray heads 36 at as low an elevation as possible since in this way a large proportion of the pressure necessary to establish the spray will be formed by the hydrostatic pressure and the amount of plus pressure which will have to be established by the throttling valve 34 will be minimized. The use of balanced hydrostatic legs I and II, as previously described, with the flow of the enriched mother liquor and the supersaturated mother liquor being jointly through pump 26 into the crystallizer makes it possible to use a single pump to establish the requisite flow in the two cycles and at the same time makes it possible to obtain maximum advantage of hydrostatic pressure on the spray head of the absorber.

The coke oven gas is fed into the absorber through inlet 40 and out through outlet 42 and then passes into the pyridine cleanup 44 which is operated and constructed as set forth in U. S. Patent 2,595,104, granted April 29, 1952. Thus mother liquor from the absorber 12 is withdrawn through overflow 46 into a tar separator 48 where tar is separated and withdrawn through line 50. Clear mother liquor passes through line 52 to the mother liquor storage tank 54 and is pumped by means of pump 56 through line 58 to the spray heads 60 of the auxiliary scrubber 62. The make-up acid required in the process is either added through line 64 to the tar separator or through line 66 to the mother liquor storage tank or both, and valves 68 and 70 can be adjusted for this purpose. The gas leaving absorber 12 passes through line 42 into the auxiliary scrubber 62 where it is brought into contact with a mixture of mother liquor and make-up acid fed to the spray head 60 and then passes out through line 72 into mist separator 74 where the mist particles and final traces of pyridine are removed from the gas. The effluent gas passes out through line 76 for such other treatment or disposal as may be desired. The condensed spray of the scrubber 62 exits through line 78 and combined with the condensed mist from the mist separator 74 which exits through line 80, passes through line 82 back into the absorber 12.

Make-up acid is thus introduced into the mother liquor in the second hydrostatic column II in an amount equivalent to the amount of ammonia absorbed. If desired, part of the make-up acid can be added directly to the mother liquor in the absorber for this purpose, but for efficiency in the pyridine cleanup, it is desirable to add as much of the make-up acid through lines 64 and 66 as is possible or practical.

Part of the crystals which are formed in the crystallizer 14 are withdrawn through line 32 through reducing valve 38 into a suitable crystal separation 84 where crystals are withdrawn through line 86 to product. The mother liquor which is thus separated from the crystals passes through line 88 either back to the absorber through line 90 or to pyridine recovery through line 92 or both. The valves 94 and 96 may be regulated to this end. Enough of the mother liquor is withdrawn through line 92 either continuously or periodically to keep the pyridine content in the mother liquor low enough for efficient pyridine recovery. Suitable conditions are described more particularly in Patent 2,595,104, supra.

It will be observed from the foregoing description of Fig. 1 that a bicyclic circuit is set up having an absorption cycle and a supersaturation cycle in which the desupersaturation or crystallization is common to both cycles. Thus the concentrated supersaturated mother liquor which collects in hydrostatic column I and the enriched mother liquor which accumulates in hydrostatic column II are comingled in pump 26 and passed through the crystallizer 14 where desupersaturation is effected and the desupersaturated solution is passed in separate streams back respectively to vacuum evaporation and the absorption to complete the two cycles.

In a preferred form of the invention, the crystallizer 14 is of the type known in the art as a classification type crystallizer in which the supersaturated solution flows upwardly through a suspension of crystals in the mother liquor. It is desirable in such a case to have the conduit 30 outlet from the top or very near the top of the crystallizer because then a minimum amount of small crystals will be carried over to the spray heads 36. It is of advantage, however, to have small crystals carried over in the conduit 30 because such crystals can be dissolved wholly or in part in the absorption either by condensing enough water in the absorption or by adding enough liquid process water to the collected spray or by both to dissolve all or part of the crystals. Since the number of nuclei present in the mother liquor in the crystallization is thus reduced, it is possible to grow larger crystals.

It is sometimes desirable, however, to grow small crystals in which case it is only necessary by the process and apparatus illustrated in Fig. 1 to reduce the vacuum pulled on the vacuum evaporation. This will raise the temperature at which the crystallization operates and, consequently, the temperature of the spray fed to the ammonia absorption. Hence, as the vacuum on the vacuum evaporator is reduced and less water evaporated therein, more and more water will be evaporated in the absorption and less heat of the reaction will be absorbed into the collected spray. The effect, therefore, will be an increase in the degree of supersaturation of the collected spray. This process can be continued until the degree of supersaturation in the spray becomes so great that new crystals spontaneously form therein, thus increasing the number of seed crystals in the system and reducing the size of the crystals. Thus by the process here described the size of the crystals may be varied over a wide range simply by regulating the degree of vacuum pulled on the vacuum evaporation.

Referring now more particularly to Fig. 2 in which like parts bear like reference characters, there will be observed the same two hydrostatic columns I and II surfacing respectively in the vacuum evaporator 10 and the absorber 12 and the same general bicyclic circuit comprising an absorption cycle and a supersaturation cycle with the crystallizer 14 common to both. In this system, however, the crystallizer instead of being operated under superhydrostatic pressure, as in Fig. 1, is operated under hydrostatic pressure and is really a part of a third hydrostatic column having as two branches the conduits 28 and 30, of which the former cooperates with the first hydrostatic column to provide the supersaturation cycle and the latter with the second hydrostatic column to provide the absorption cycle.

In conduit 28, there is provided a circulating pump 98 arranged to provide a flow in the supersaturation cycle from the crystallizer through line 28 to the vacuum evaporator 10, down through line 20, and up through line 22 into the crystallizer. Since all parts of this cycle are under hydrostatic pressure, the pump operates primarily as a circulating pump to maintain the desired rate of flow to and from the vacuum evaporator and up through the crystallizer.

Conduit 30 is arranged to surface in a gas separator 100 which connects back to the absorber through gas line 102. The top 104 of conduit 30 acts as the overflow for the absorption cycle and is set to maintain the desired elevation of liquor in the second hydrostatic column II. The liquor which overflows into the gas separator 100 flows down through line 106 into the tar separator 48 and from there to the mother liquor storage 54. From there it is pumped by pump 56 through lines 58a, 58b and 108 to the spray heads 60 and 36. Valves 110 and 112 can be regulated to proportion the mother liquor as desired between the two spray heads 36 and 60. Make-up acid is introduced through line 114 into line 58B to provide the relatively strong acid solution required for the pyridine cleanup. If desired, part of the make-up acid may be introduced through line 116 so as to increase the acid concentration in the mother liquor sprayed into the absorber 12. The collected spray of scrubber 62 and the condensed mist of mist separator 74 passing respectively through lines 78 and 80 into line 118 is either introduced into the tar separator through line 120 or into the return of the absorption cycle through line 122 and valves 124 and 128 may be suitably regulated for this purpose.

The conditions for operation for this modification are essentially the same as those for the modification of Fig. 1. It may be observed, however, that the mother liquor fed to the spray head 36 of absorber 12 may be slightly below the saturation concentration if sufficient make-up acid or other process water is added, whereas in the modification of Fig. 1, it is substantially at the saturation concentration and that the flow from the crystallizer to the absorption is not direct as it is in Fig. 1. If desired, however, line 108 can be eliminated and desupersaturated solution pumped to the spray head 36 directly from the crystallizer 14. Also it may be seen that the necessary pressure on the spray head 36 is established by pump 56 and the flow in the supersaturation cycle by pump 98, whereas in the modification of Fig. 1, both these flows are maintained by a single pump 26.

While the invention has been set forth with reference to particular embodiments, it will be understood that the invention in its broader aspects may be variously embodied and that particular embodiments given are not limiting except as pointed out in the specification and set forth in the appended claims.

I claim:

1. A process for recovering the ammonia of coke oven gas as crystals of ammonium sulfate comprising the steps of dividing a solution which is dilute as to its content of sulfuric acid and saturated as to its content of ammonium sulfate into two portions, contacting one of said portions with said gas in an absorption zone so that the ammonia of the gas reacts with the acid of the solution to increase the ammonium sulfate content of said one portion, removing water from the other portion in an evaporation zone so as to increase the ammonium sulfate content of said other portion, thereafter combining said portions, and passing the combined portions through a bed of ammonium sulfate crystals in a crystallizing zone, whereby the excess ammonium sulfate crystallizes out and the solution remaining provides said first named solution to continue the process.

2. A process for recovering the ammonia of coke oven gas as crystals of ammonium sulfate comprising the steps of dividing a solution which is dilute as to its content of sulfuric acid and saturated as to its content of ammonium sulfate into two portions, passing one of said portions through an absorption zone in contact with said gas so that the ammonia of the gas reacts with the acid of the solution to increase the ammonium sulfate content of said one portion, passing the other portion through an evaporation zone to evaporate water therefrom so as to increase the ammonium sulfate content of said other portion, thereafter combining said portions, and passing the combined portions through a bed of ammonium sulfate crystals in a crystallizing zone so as to crystallize out the excess ammonium sulfate so that a solution corresponding to said first named solution is provided to continue the process.

3. A process for recovering the ammonia of coke oven gas as crystals of ammonium sulfate comprising the steps of dividing a solution which is dilute as to its content of sulfuric acid and saturated as to its content of ammonium sulfate into first and second portions, increasing the ammonium sulfate content of said first portion by contacting the first portion with said gas, whereby the reaction of said ammonia and acid increases the ammonium sulfate content of said first portion, increasing the content of ammonium sulfate in said second portion by removing water from said second portion in an evaporation zone, thereafter combining said first and second portions, and passing the combined portions through a bed of ammonium sulfate crystals in a crystallizing zone so that the excess ammonium sulfate is crystallized out and the remaining solution constitutes said first named solution for continuing the process.

4. By-product coke oven apparatus comprising a gas- and-liquid-tight ammonia absorption shell; gas inlet and gas outlet means for said shell; spray heads located within said shell above said gas inlet for spraying absorbent liquid into the gas in said shell; a liquid outlet at the bottom of said shell; a vacuum evaporator; a downflow conduit connected at the bottom of said evaporator; a liquid-tight crystallizing vessel; a first conduit having a stem opening into the bottom of said crystallizing vessel and two branches respectively joined to the liquid outlet of said shell and to the downflow conduit of said vacuum evaporator for conducting liquid from said shell and evaporator to a lower portion of said crystallizing vessel; a second conduit for conducting liquid from the upper portion of said crystallizing vessel to said evaporator to form a first closed circuit comprising said evaporator and said crystallizing vessel; further conduit means for conducting liquid from the upper portion of said crystallizing vessel to said spray heads to form a second closed circuit comprising said crystallizing vessel and said shell; means for causing a flow of absorbent liquid in one direction in both said circuits so that the flow from both circuits is upwardly through said crystallizing vessel; and means for withdrawing crystals from said crystallizing vessel.

5. Apparatus of claim 4 wherein a pump located in the stem of said first conduit constitutes the sole energy source for causing the flow of liquid upwardly through the crystallizer and in one direction through the two circuits, said second conduit for conducting liquid from said upper portion of the crystallizing vessel to said evaporator includes a throttling valve for regulating the pressure created in the crystallizing vessel by said pump, and an overflow conduit is associated with said absorption shell.

6. Apparatus of claim 4 wherein said second conduit also includes a pump for causing flow of liquid in one direction from said crystallizing vessel to said evaporator and said further conduit means includes a tar separation vessel, a mother liquor storage tank and a pump between the storage tank and said spray heads for causing tar separation from the liquor in advance of the application of the liquor from the crystallizing vessel to said spray heads; and an overflow conduit is associated with said absorption shell.

7. Apparatus for removing the ammonia from coke oven gas with a water solution which is dilute as to its content of sulfuric acid and saturated as to its content of ammonium sulfate so as to recover the ammonia from said gas as crystals of ammonium sulfate, comprising crystallizer, absorber and evaporator devices, each device having an inlet and an outlet, first transmission means connecting the outlet of said crystallizer with the inlets of said absorber and evaporator for dividing said solution into two portions and transmitting one portion from said crystallizer to said absorber and the other portion from said crystallizer to said evaporator, said absorber including means for contacting said one portion with said gas so as to increase the ammonium sulfate content thereof, said evaporator including means for removing water from said other portion so as to increase the ammonium sulfate content thereof, and second transmitting means connecting the outlets of said absorber and evaporator with the inlet of said crystallizer for combining said portions from said absorber and evaporator and transmitting the combined portions to said crystallizer, said crystallizer including a bed of crystals through which said combined portions flow from the inlet of said crystallizer to its outlet whereby the excess ammonium sulfate of said portions crystallizes out and the liquid remaining constitutes said solution.

References Cited in the file of this patent

UNITED STATES PATENTS

| | | |
|---|---|---|
| 1,923,212 | Jost | Aug. 22, 1933 |
| 2,368,901 | Tiddy | Feb. 6, 1945 |
| 2,383,171 | Tiddy | Aug. 21, 1945 |
| 2,511,306 | Tiddy | June 13, 1950 |
| 2,599,067 | Otto | June 3, 1952 |
| 2,623,814 | Gray | Dec. 30, 1952 |
| 2,645,559 | Otto | July 14, 1953 |
| 2,671,716 | Ayres | Mar. 9, 1954 |